United States Patent

[11] 3,585,451

| [72] | Inventor | Arthur R. Day, III<br>Camp Hill, Pa. |
|---|---|---|
| [21] | Appl. No. | 887,857 |
| [22] | Filed | Dec. 24, 1969 |
| [45] | Patented | June 15, 1971 |
| [73] | Assignee | Borg-Warner Corporation<br>Chicago, Ill. |

[54] SOLID STATE MOTOR OVERLOAD PROTECTION SYSTEM
11 Claims, 1 Drawing Fig.

[52] U.S. Cl................................................. 317/13,
317/38, 317/20, 317/22, 317/41, 62/217, 62/230
[51] Int. Cl................................................ H02h 7/085,
H02h 3/10
[50] Field of Search............................................. 62/217,
230; 317/13, 20, 36 TD, 22, 38, 41, 33; 340/253
A; 318/476, 477

[56] References Cited
UNITED STATES PATENTS
2,955,436  10/1960  Miner........................... 62/217 (X)

| 3,003,331 | 10/1961 | Coburn | 62/217 (X) |
| 3,204,423 | 9/1965 | Resh | 62/217 (X) |
| 3,317,795 | 5/1967 | Steen | 317/33 (X) |

*Primary Examiner*—J. D. Miller
*Assistant Examiner*—Harvey Fendelman
*Attorneys*—Donald W. Banner, William S. McCurry and John W. Butcher

ABSTRACT: A solid state overload protection system for protecting a polyphase electric motor which drives a reciprocating- or positive-displacement type compressor of the type having mechanical load reducing means is disclosed. The system samples the peak current drawn by each phase of the electric motor and the temperature of the motor windings. During overload (overcurrent or overtemperature) situations, a mechanical load reducer is latchably operated to reduce the motor loading. If the overload condition persists (e.g. for 6 seconds) after the load reduction has occurred the current to the motor is interrupted. Otherwise, the motor is reloaded after a longer period (of, e.g., 6½ minutes).

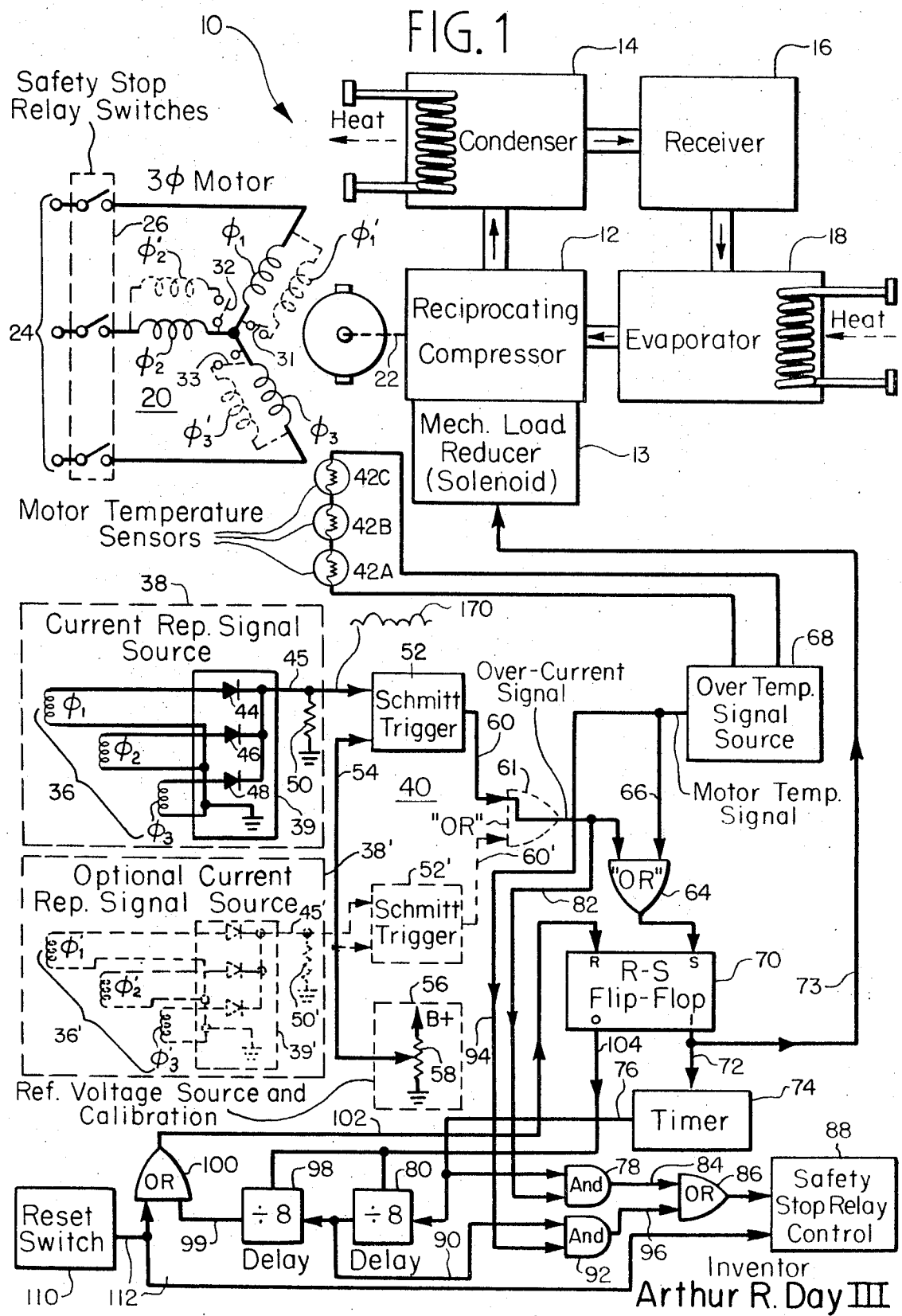

SOLID STATE MOTOR OVERLOAD PROTECTION SYSTEM

FIELD OF THE INVENTION

The present invention relates to a motor overload protection system and particularly relates to a solid state motor overcurrent and overtemperature protection system for use in the protection of electric motors used in driving reciprocating or positive-displacement compressors in a refrigeration system.

BACKGROUND OF THE INVENTION

The present invention provides a new and improved solid state motor overload protection system which is of special utility in protecting an electric motor which drives a positive-displacement compressor of the type that may be employed in a refrigeration system. The positive-displacement or reciprocating-type compressor places a different type of loading upon its prime mover then do rotating compressors, such as the centrifugal compressor. To deal effectively with this different loading situation on electrical motors employed as the prime mover thereof, and to provide for protection of that motor against overcurrent and overtemperature conditions is the primary object of the present invention.

The present invention constitutes an improvement of the system disclosed and claimed in the U.S. Pat. Application of the present inventor, Arthur R. Day and Francis A. Kimpel Ser. Number 882,792 filed Dec. 5, 1969, entitled "Overload and Overcurrent Regulation and Protection System" which application is assigned to the same assignee as is the present invention. This is an improvement over the previous invention of special utility with reciprocating compressors using step type unloaders and, in addition, includes a temperature sensing feature.

The present invention provides for an improved solid state motor overload and overtemperature protection system over existing systems in that it provides for an automatic reduction of the mechanical load in response to an overload situation as indicated by either an excessively high temperature in the motor windings or excessively high current of long duration. The present system also provides for automatically unloading of the compressor for a predetermined time period of relatively long duration (e.g. 6½ minutes) after an overload (overtemperature or overcurrent) is sensed thus preventing rapid cycling of the mechanical load reducer. The present invention also has the advantage of allowing the refrigeration system to provide some cooling capacity during overload although reduced in magnitude from the normal operating capacity.

SUMMARY OF THE INVENTION

An overload protection system for a compressor motor constructed in accordance with the present invention comprises means for sampling a motor load condition, such as temperature or current, and for developing a signal representative of that condition. A mechanical load reducer on the compressor, such as a solenoid operated gas bypass valve, is provided.

Means, such as Flip-Flop, for latchably operating the load reducer in response to a sensed overload and a timer for producing at least a first time delayed signal and for restoring the latchably operating means for the load reducer to reload the compressor after a predetermined longer delay are also provided. Additional means, such as a safety relay control and relay switches, for interrupting the motor current are provided which operate in response to the first time delay signal if the representative signal indicates an overload still present.

BRIEF DESCRIPTION OF THE DRAWINGS

The features of the present invention which are believed to be novel are set forth with particularity in the appended claims. The invention, together with further advantages thereof, may best be understood by reference to the following description taken in connection with the accompanying drawing, in the single FIG. of which like reference numerals identify like elements, and which is a schematic diagram, partly in block form, of an electric motor driven refrigeration system and a protection and load regulation system for protecting the electric motor against overloads constructed in accordance with the present invention.

DETAILED DESCRIPTION

Referring to the FIGURE there is depicted a refrigeration system including its motor overload protection system which is constructed in accordance with the present invention. The overall refrigeration system is generally designated by the numeral 10. The refrigeration system 10 is of the large capacity type such as might be employed in air conditioning a large building and employs the vapor-compression refrigeration cycle.

In such vapor-compression cycle equipment it is conventional to employ a closed loop processing of a refrigerant such as freon. The refrigerant is continuously processed in a closed loop wherein it is compressed, liquefied to give up heat at one stage, collected, then evaporated to take on heat at another stage and finally recompressed again.

In achieving this cycle the system 10 employs a positive-displacement or reciprocating compressor 12 which compresses the refrigerant and from which the compressed refrigerant is controllably fed to a condenser unit 14. The condenser 14 often includes a water conductive heat exchanger to facilitate the removal of heat therefrom. From the condenser 14, the now liquid refrigerant is received and collected in a receiver unit 16 and controllably delivered therefrom to an evaporator unit 18. In the evaporator 18 the refrigerant is again changed to a gaseous state thereby absorbing heat. A second heat exchanger employing water as a medium is often provided in the evaporator 18. From the evaporator 18 the gaseous refrigerant is continuously returned for recycling to the compressor 12. The primary motive power for the system 10 is supplied by a three-phase electric motor 20 which is mechanically coupled to the compressor 12 as signified by the dashed line 22.

The motor 20 is of a large capacity type and is fed from three-phase power lines 24 which are connected to the coils of the motor 20 and are provided with various conventional switching which includes a set of controlled in common safety stop relay switches 26, one for each line 24, for interrupting current. Normally, the motor 20 draws current and power from the lines 24 in proportion to the mechanical load placed upon it by the compressor 12. The effective load of the compressor 12 is variable by mechanical load reducing means 13 such as solenoid controlled refrigerant gas bypass system. Reference is made to U.S. PAT. Nos. 3,435,626 and 2,763,475 for compressors employing different types of such load-reducing means. Basically, however, such means 13 serve to reduce the pressure head at the exit port or ports of the reciprocating compressor 12 to thereby decrease the force necessary to be exerted there against and to thereby lower the load the compressor 12 places upon the motor 20. This load varying means may thus comprise a gas bypass valve operated by a relay or solenoid.

The electric motor 20 may be of any polyphase type, as two or three phase types, and may consist of a dual winding motor in which secondary winding $\Phi_1'$, $\Phi_2'$ and $\Phi_3'$ are respectively connected in parallel with the primary windings $\Phi_1$, $\Phi_2$ and $\Phi_3$. These secondary windings are often provided with a time delay relay control switch 31, 32 and 33. These coils with the time delay switches are employed to prevent excessively high current being drawn by the windings during startup of the motor while also presenting a net low resistance in normal operation. The motor 20 may also be of the hermetic type.

In accordance with the present invention, an overload protection system generally designated 40 is provided for protecting the motor 20 from overload conditions. This overload system includes temperature sensors 42A, 42B, 42C which are preferably buried within respectively the motor 20 coils $\Phi_1$, $\Phi_2$ and $\Phi_3$ so as to sense the temperature thereof. In addition, current sensing means comprising the series of current transformers 36 for the primary coils $\Phi_1-\Phi_3$ and, if secondary coils $\Phi_1'-\Phi_3'$ are provided, additional current sensing transformer coupled coils 36' may be provided. The coils 36 form part of a current representative signal source 38 which may be of the type described and shown in the aforementioned application of Day and Kimpel or may be the depicted simpler circuit. In the depicted circuit 38, the coils $\Phi_1$, $\Phi_2$ and $\Phi_3$ are coupled to a rectifying circuit 39 wherein one side of each of the coils $\Phi_1-\Phi_3$ is grounded and the other side is connected to the anode of a diode 44, 46 or 48. The cathodes of the diodes 44, 46 and 48, are connected to the output line 45 of the current representative signal source 38 and through a resistor 50 to ground. It should be noted that when the circuit 38 is utilized, the current transformers 36 must be designed not to magnetically saturate due to the DC current component through them.

It should be understood that "ground" is here taken as a plane of reference potential and need not be earth potential. Likewise the diodes herein referred to are preferably solid state diodes.

The output line 45 from the current representative signal source 38 is connected to one of the two inputs of a comparator 52 of the Schmitt Trigger type whose other voltage primary input line 54 is connected to a source 56 of reference voltage. The source 56 may simply comprise a variable tapped resistor 58 and a source of regulated constant potential B+ with the voltage tap connected to the line 54 and with the resistor 58 connected between the regulated voltage source B+ and reference or ground potential. The Schmitt Trigger 52 is preferably an operational amplifier circuit such as was disclosed in the aforementioned U.S. Patent Application. The output from the Schmitt Trigger 52 is fed over a line 60 and represents an overcurrent signal.

As mentioned before, the three-phase motor 20 may or may not be provided the secondary coils such as $\Phi_1'$, $\Phi_2'$ and $\Phi_3'$. If it is so provided, the circuit 38' corresponding to the circuit 38 may be provided and a second Schmitt Trigger 52' whose output on line 60' may be connected through an "OR" gate 61 to furnish an output signal representing an overcurrent situation occurring in any of its phase windings.

The output representing the overcurrent signal such as line 60 is fed to an "OR" gate 64 whose other input line 66 is the output from the overtemperature signal source 68. The overtemperature signal source 68 is connected to the motor temperature sensors 42A, 42B and 42C preferably thermistors as shown, however, thermo-switches may also be employed. The signal source 68 is preferably a bridge circuit in which the thermistors 42A, 42B and 42C form one branch thereof as the element 42.

The output from the "OR" gate 64 is fed to the set input "S" of an R—S Flip-Flop 70 whose "1" output is fed from a conductor line 72 to another conductor 73 and thus to the mechanical load reducer solenoid 13. Thus, the presence of an overcurrent signal on line 60 (or 60') would serve to set the R—S Flip-Flop 70 and to energize the lines 72 and 73, and thus to activate the mechanical load reducing solenoid of the mechanical load reducer 13 thereby reducing the mechanical load on motor 20. Similarly, a sensed overtemperature communicated from the sensors 42A, 42B and 42C to the signal source 68 would produce an output signal on a line 66 which would also set the Flip-Flop 70 to operate the mechanical load reducer 13.

The line 72 is also connected to the timer unit 74 which is preferably of the unijunction transistor–RC oscillator-type as employed in the previously referred to patent application. However, any well-known equivalent timing circuit may be employed. The timer 74 functions, after a sensed overtemperature or overcurrent signal has activated the Flip-Flop 70, to produce on its output line 76 a first output signal. This signal is preferably produced after a short delay of, for example, 6 seconds, and is fed to an "AND" gate 78 and to a further timing unit 80 which is preferably a divide-by-eight binary counter circuit. Reference for various types of binary counter and logic circuits may be had in chapters 5 and 7 of the G.E. Transistor Manual, Seventh Edition. The other input to the "AND" gate 78 is the overcurrent signal which is connected thereto via a line 82. The output of the "AND" gate 78 is fed via line 84 through an "OR" gate 86 to the safety stop relay control unit 88. The safety stop relay control 88 controls the relay switches 26.

Thus, the presence of either the signal on line 60 or the signal on line 66 functions to set the Flip-Flop 70. Every 6 seconds thereafter an output pulse appears on line 76 and if the overcurrent signal is present on line 60 the safety stop relay control 88 is activated to open the relay switches 26. The output of the divide-by-eight circuit 80 is connected through a conductor 90 to a second "AND" gate 92 whose other input is connected, via line 94 to the output of the overtemperature signal source 68. The divide-by-eight circuit 80 functions to produce a square wave output signal whose period is a predetermined multiple of the period of the output pulses on line 76. Thus, for example, 48 seconds after the setting of the Flip-flop 70 a second timer output signal is generated along line 90 and communicated to the "AND" gate 92. If, at this time, the output from the signal source 68 indicates an overtemperature condition exists in the coil windings of the motor 20, the signal is produced from the output 96 of the "AND" gate 92 which output 96 forms the other input to the "OR" gate 86. Therefore, a sensed overtemperature signal at the end of 48 seconds will also activate the safety stop relay control 88. The second time delay signal which is the output of the divide-by-eight circuit 80, is also fed through a second divide-by-eight counter circuit 98. The output from this circuit 98 occurs at approximately 6½ minutes after the initial setting of the R—S Flip-Flop 70 and is communicated via a line 99 to an "OR" gate 100 whose output is coupled via a line 102 to the reset input R of the R—S Flip-Flop 70. This output signal of the circuit 98 functions to reset the Flip-Flop 70.

The resetting of the R—S Flip-Flop 70, after for example, a 6½ minute time delay, automatically clears via a line 104 the divide-by-eight circuits 80 and 98 and removes, at least instantaneously, the input signal 72 from the line 72 to the unijunction transistor timer 74. This also removes the signal from the line 73 causing the reloading of the reciprocating compressor 12 to place an additional load on the motor 20.

The safety stop relay control 88, however, (if the safety stop relay has been activated by an overload signal communicated through the "OR" gate 86) will maintain the switches 26 open until a reset switch 110 is pressed. Whenever the reset switch 110 is pressed a signal communicated over its output line 112 causes the safety stop relay control unit 88 to close the switches 26. Also via its output 112, the relay switch is coupled to one of the inputs of the "OR" gate 100 to reset the Flip-Flop 70 whenever the reset switch 110 is closed.

OPERATION

Each of the current transformer 36 (36') coils in $\Phi_1$, $\Phi_2$, $\Phi_3$ (and $\Phi_1'$, $\Phi_2'$, $\Phi_3'$ if employed) senses a different phase winding current in order to provide an overload signal that follows the instantaneous maximum current being drawn by any one phase winding. This signal is developed on the conductor 45 (45') and in general the voltage vs. time curve might appear as the curve 170 in the FIGURE, that is, with an overcurrent in one phase, such as $\Phi_3$. These transformers 36 (36') should be matched to provide equal level outputs for equal inputs.

This signal representing the instantaneous maximum current drawn by any of the motor windings is fed via conductor 45 (45') to the Schmitt Trigger comparator 52 (52'), which preferably has a built-in hesitance or time delay in response to an overload voltage signal so as to prevent its operation by short term transient signals or very short term overload situations. However, if a sufficiently large overcurrent signal, of a magnitude selected by the adjustment of the calibration unit 56, persists, or recurs with sufficient frequency that it constitutes a serious overload situation the Schmitt Trigger comparator 52 (52') will operate. This event causes a very quick change in the output voltage on line 60 (60') from one voltage level to another, such as, for example from B− to B+.

This sudden change in voltage is sufficient to set the Flip-Flop 70 causing its "1" and "0" outputs to change from one voltage level to another (such as 0 to B+ and B+ to 0 v., respectively).

This change of signal operates the solenoid of the mechanical load reducer 13 to reduce the mechanical load exhibited by the compressor 12. This, of course, reduces the load on the motor 20 and lowers the power it must draw. If the overcurrent situation was due to a temporary unbalance line voltage from the lines 24 or an excessive load from the compressor 12, the current drawn by the motor 20 will quickly drop below the triggering level of the Schmitt Trigger 52 (52'). In this situation, after 6half ½ the timing circuit 71 will reset the Flip-Flop 70 (over line 99, "OR" gate 100 and line 102) to reload the compressor 12 by changing the output on line 73 back to its previous level.

However, the initial overcurrent signal may not have been due to a benign situation but instead could be due to a short circuit or persistant excessive unbalance in the supplied line voltage on the lines 24. In this case the continuing overcurrent signal will, with the periodic 6-second timer signal, operate the safety stop relay control 88 to open the switches 26. That is, the presence of both the overcurrent signal on line 60 and the 6-second signal on line 76 are communicated over conductors 82 and 77 to the "AND" gate 78 and thus via conductor 84 and the "OR" gate 86 to the safety stop relay control 88.

In such a case the motor 20 is shutdown and only the manual activation of the reset push button switch 110 by an operator will close the relay switches 26. If, after this switch 110 is pushed an overcurrent is again sensed, the Schmitt Trigger will again fire to unload the compressor 12 and, after 6 seconds, the safety stop relay switches 26 will again be opened if the overload has not reduced. The closing of the reloading relay of the reducer 13 while the motor 20 is shutoff does not constitute a problem because the effective load of the shutdown system remains at approximately the unloaded state during the shutdown period.

During any startup of the motor, either as occasioned by the reset push button switch 110 being pushed after an overcurrent or overheat situation or in any normal startup, the initial large current drawn by the motor 20 functions to operate the unloading means 13. Normally, the sensed current will drop to a lower level by the end of 6 seconds as the motor increases its speed so that the safety stop relay will not be operated. That is, the drop in the voltage level output on lines 60 and 82 at the time of the 6-second signal on conductor 77 prevents any output from appearing on the output 84 of the "AND" gate 78. After a 6½ minute delay, the motor 20 is normally operating at full speed and the load reducing means 13 will be deactivated by the timing signal on line 102 which resets the Flip-Flop 70.

The temperature sensing circuit including the sensors 42A, 42B, 42C and overtemperature bridge 68 functions to produce an overtemperature signal on lines 66 and 94 when any winding of the motor 20 is at or above a preselected dangerous temperature. It may be, especially in the case of a hermetic motor, that the windings can reach an excessively high temperature. At elevated temperatures the electrical insulations effectiveness decreases. This may lead to a breakdown of the insulation and short circuiting of the coils. This overtemperature situation may occur because of environmental factors independent of the current drawn and at certain high temperatures an otherwise normal or acceptable current may result in breakdown, especially as it adds more thermal energy to the coils. Therefore, it is desirable to decrease the current drawn when the coils are at a high temperature and at a sufficiently high temperature, to deenergize the motor winding by opening the safety stop relay switches 26.

To achieve these ends, the present system functions to decrease the load by activating the mechanical load reducing means 13 whenever the temperature sensed by the sensors 42A, 42B and 42C exceeds a preselected value. When this occurs the voltage signal on line 66 as communicated through the "OR" gate 64 reaches the triggering or setting level of the Flip-Flop 70 and sets the Flip-Flop. This results in the reduction of the load by the means 13 as commanded over the conductor 73. It also sets the timer unit 71 operating. Assuming that the current was normal despite the high temperature, then the 6 second signal would not activate the safety stop relay control 88. However, if the reduction of the load has not resulted in a reduced sensed temperature in 48 seconds the 48 second signal on line 90 together with the continued high temperature signal on line 94, would, through the "AND" gate 92, its output line 96 and the "OR" gate 86 operate the safety stop relay control 88 to open the switches 26.

Should the overtemperature situation have passed, however, the relay switches 26 would not be operated and instead, after a total delay of 6½ minutes, the compressor 12 would be reloaded by the output, on line 99, from the timer 71 to resume its normal operation.

It may be noted that the dangerous situations of either overheating or overcurrent, neither of which might be sufficient alone to operate the safety stop relay switches 26, occurring at the same time may cause the operation of these switches 26. This desirable feature of the present invention provides an additional safety factor for the motor 20. Additionally, the recurring 6 second timing pulses and 48 second timing signals in conjunction with the "AND" gates 78 and 92 act to "sample" the state of the motor current and temperature signals during the entire 6½ minute unloading period and thus provide complete protection for the motor 20.

For completeness in the disclosure of the above-described system, but not for purposes of limitation, the following representative values and component identifications are submitted. Those skilled in this art will recognize that many alternative elements and values may be employed in constructing systems and circuits in accordance with the present invention. Indeed, even though the herein set out system and circuit are the presently considered best mode of practicing the invention, the present inventors may themselves decide, after further experiments and experience or for differing environments of use, to make modifications and changes.

| Part | Type or value |
|---|---|
| Transformers 36 and 36' | Toroidal current transformer, primary 100 a.: 25 ma. secondary, Milwaukee Transformer Co. (MTC) P/N KI-13811. |
| Gates 61, 64, 78, 86, 92, and 100 | Motorola MC846P., Quad 2-input gates. |
| Diodes 44, 46, 48, 44', 46', and 48' | 1N4001. |
| Resistors 50 and 50' | 150 ohms, 3 watt wire wound. |
| Potentiometer 58 | 10K ohms, 2 watt wire wound. |
| Thermistors 42A, 42B, and 42C | G. E. 1D203. |
| Voltage source B+ | +15.0 v. (regulated). |

Suitable circuits for comparators 52 and 52' are described in "Fairchild Semiconductor Linear Integrated Circuits Applications Handbook," pages 165–166, Fairchild Semiconductor Company (1967).

Suitable circuits or the unijunction transistor timer 74 can be found in "G.E. Transistor Manual," Seventh Edition, Chapter 13, General Electric Company (1964).

Suitable circuits for the 8 binary counter circuits 80 and 98 are described in "G.E. Transistor Manual," Seventh Edition, Chapter 5, General Electric Company (1964) and can be implemented using Motorola MC850P Flip-Flops.

Several suitable circuits for the temperature sensor bridge 68 are indicated in "Burr-Brown Handbook and Catalog of Instrumentation Amplifiers," pages 22–24, Burr-Brown Research Corporation (1968).

While efforts have been made to accurately record and transcribe the above set out values it is of course, possible that one or more errors may have inadvertently crept into this compilation. To guard against these, the reader is cautioned to employ the well-known methods to mathematically and experimentally verify the above.

As should now be apparent a new and improved solid state overload protection system has been provided which has several advantageous features. The system provides for a response for overcurrents in only one winding as well as average overcurrent situations. It also allows for ordinary startup and large load-shifting situations without unnecessarily shutting down the motor, while also reducing the mechanical load during such occasions to allow for a better overall functioning of the motor and compressor systems without excessive cycling of the load reducing means.

The system has the further advantage of having accurate time delay periods as the electric time delay unit is temperature compensated. Also easy calibration is provided as only one calibration control is needed and this can be easily adjusted by observation of the overcurrent signal output of the Schmitt Trigger circuits.

The system is versatile, being adaptable to one, two or three phase motors each of part-winding starting, or across-the-line starting configuration, by providing more or less input transformer-couplings to the current representative signal developing units.

The use of a thermistor as the temperature sensor is preferred because it provides for quicker response to large overtemperature conditions than do bimetal switches or other switching devices.

The present system also, in providing for capacity reduction in both overcurrent situations and overtemperature situations, prevents unnecessary shutdowns of the compressor and allows time for the situations to correct themselves. Furthermore, the above-described system is economical to operate as it used low power sensors having low power outputs. This further simplifies the construction of the system and allows for the use of economically priced low power solid state components which contribute to the low initial cost of the system. Additionally, the present system eliminates the need for a separate mechanical timer, such as a 5 minute timer, which are often currently employed to keep the unloading means from loading the compressors during startup.

Various of the features of the invention have been particularly shown and described, however, it should be obvious to one skilled in the art that various modifications may be made therein without departing from the scope of the invention.

What I claim is:

1. In a refrigeration system of the type employing an electric motor driven compressor having mechanical load reducer, the improvement in the protection system for the electric motor comprising:
    means for sampling a first motor overload condition and for providing a signal when an overload condition exists;
    means, coupled to said overload signal producing means, for controlling the mechanical load reducer to latchably reduce the mechanical load of the compressor in response to the commencement of the overload signal;
    a timer unit coupled to said mechanical load reducer controlling means for producing at least an early and a late delay signal in response to the latchably reducing of the mechanical load by said load reducing control means, said early delay signal occurring a short interval after the reduction of the mechanical load and said late delay signal occurring after a further period of time;
    means responsive to the presence of both said early delay signal and said overload signal for deenergizing the motor; and
    means responsive to said late delay signal for operating said load reducer control means to unlatch the reduction of the mechanical load to the compressor;
    whereby a continuous or frequently reoccurring overload may releasably deenergize the electric motor while an infrequent and temporary overload may decrease the mechanical load on the electric motor to allow for correction of the overload situation.

2. The improvement in a refrigeration electric compressor motor protection system as defined in claim 1, wherein:
    a second means for sampling a second motor overload condition and for providing a second signal when an overload condition exists is provided;
    said means for controlling the mechanical load reducer is also coupled to said second overload signal producing means and responds to the commencement of either and both of the first and second overload signals to latchably reduce the mechanical load of the compressor;
    said timer unit also produces an intermediate delay signal, in response to the latchably reducing of the mechanical load which intermediate delay signal occurs after the early signal and before the late signal;
    said deenergizing means is also coupled to said second sampling means for deenergizing the motor when the second overload signal and the intermediate delay signal are present.

3. The improvement in a refrigeration electric compressor motor protection system as defined in Claim 2, wherein:
    said timer unit also produces additional sampling signals after the early delay signal and before the late delay signal for causing said deenergizing means to deenergize the motor should the first motor overload signal be present at the occurrence of these additional signals.

4. The improvement in a refrigeration electric compressor motor protection system as defined in claim 3, wherein:
    said timer unit also produces second sampling signals periodically after said intermediate delay signal and before said late delay signal for causing said deenergizing means to deenergize the motor should the second motor overload signal be present at the occurrence of these second additional signals.

5. The method of protecting an electric motor of the type used to drive a compressor with means for reducing its mechanical load from electrical overload comprising the steps of:
    sensing a load on the motor,
    developing a load representative signal therefrom,
    comparing that signal with a standard,
    producing an overload signal when that load representative signal exceeds the standard;
    reducing the mechanical load which the compressor presents to the motor in response to the overload signal;
    producing at least two delayed signals in response to the overload signal, an early time delay signal which occurs after a short time delay period and a later time delay signal which occurs after a long time delay period;
    interrupting the current supplied to the motor if at the time of the early delay signal, the overload signal is still present;
    reloading the compressor in response to the later time delay signal;
    whereby persistant and frequently reoccurring sensed overloads will cause the current to be interrupted but short time and infrequent overloads will cause the mechanical load to be reduced to allow for correction of the short time and infrequent overload situations.

6. An overload protection system for a compressor motor comprising:
    means for sampling a motor load condition and for developing a signal representative of that condition,
    a mechanical load reducer for the compressor;
    means, coupled to said load reducer and to said sampling and load signal developing means, for latchably operating said load reducer in response to load representative signal indicating a preselected magnitude of overload;
    a timer coupled to said load reducer operating means for producing at least two time delayed signals in response to the operation of the load reducer by said operating means, one of said delay signals being delayed by one period of time and the other being delayed in time by another longer period of time, from the operation of the load reducer;

means, coupled to said sampling and load representative signal producing means and to said timer, for deenergizing the compressor motor in response to the one time delay signal if the load representative signal represents a motor overload above a predetermined level when the one signal occurs and not deenergizing the compressor if it does not; and means, coupled to said timer and said load reducer operating means for causing said load reducer operating means to stop the operation of said load reducer to reload the compressor motor in response to the occurrence of another delay signal, whereby small and short duration overloads may be counteracted without deenergization of the motor but large and persistant overloads will cause deenergization and the motor is protected.

7. The overload protection system for a compressor motor as defined in Claim 6, wherein:

said sampling and load representative signal producing means samples current drawn by the motor and produces a voltage signal representative of an overcurrent overload situation, a temperature sensor is provided associated with the windings of the compressor motor;

means, coupled to said temperature sensor and to said load reducer operating means are provided, for developing a signal representative of an overtemperature condition in the motor windings, and for causing said load reducer operating means to latchably reduce the load of the compressor in response to the overtemperature signal.

8. The overload protection system as defined in claim 7 employed to protect a polyphase compressor motor, wherein:

said current sampling and overcurrent signal producing means, includes:

means for sampling the current drawn by each phase winding of the polyphase motor and for developing therefrom a DC voltage signal whose amplitude is proportional to the maximum instantaneous current being drawn by any one of the phase windings, and a comparator for comparing the DC voltage signal of said sampling means with a reference and for producing the overcurrent signal when the DC voltage signal reaches or exceeds a predetermined relationship with said reference signals.

9. The overload protection system as defined in claim 7, wherein:

said latchably operating means for said load reducer includes a Flip-Flop having a "set" and "reset" input and a "1" and "0" output which "1" output is coupled to said load reducer and said "set" input is coupled to both said overtemperature signal producing means and to said overcurrent signal producing means to have said Flip-Flop "set" by either or both of the overtemperature on the overcurrent signals;

said timer includes:

a unijunction transistor timing circuit connected to the "1" output of said Flip-Flop for producing the delay signal one period of time after the "1" output signal is produced by setting said Flip-Flop; and a first delay circuit coupled to said unijunction transistor timing circuit for activation by the one of the delay signals to an intermediate delay signal occurring in time between the one and the other delay signals; and said deenergizing means includes:

an "AND" gate whose inputs are connected to the overtemperature signal producing means to produce a command signal when both of said signals are present;

means responsive to the command signal to deenergize the motor.

10. The overload protection system as defined in claim 9, wherein:

said timer further includes a second delay circuit coupled to said first delay circuit for activation by the intermediate delay signal to produce, after a further time delay, the other delay signal which is coupled to the "reset" input of said Flip-Flop to reset it and thereby reload the compressor;

said deenergizing means includes:

a second "AND" gate which has two inputs one of which is connected to said unijunction transistor timing circuit of said timer and the other of which is connected to the overcurrent signal producing means, to develop a second command signal output in response to the presence of both the one delay signal and the overcurrent signal, said means responsive to the command signal to deenergize the motor, and means for reenergizing the motor in response to a reset signal;

the system includes a reset switch for producing a reset command which is coupled to both the "reset" input of said Flip-Flop to reset said Flip-Flop and also to said reenergizing means for reenergizing the motor.

11. The overload protection system as defined in claim 6, wherein:

said timer also includes means for producing additional sampling signals at times between the one and other delayed signal so as to periodically sample therebetween the motor load condition and to deenergize the compressor motor should the sensed overload exceed the predetermined level at occurrence of the additional sampling signals.